Patented Aug. 21, 1923.

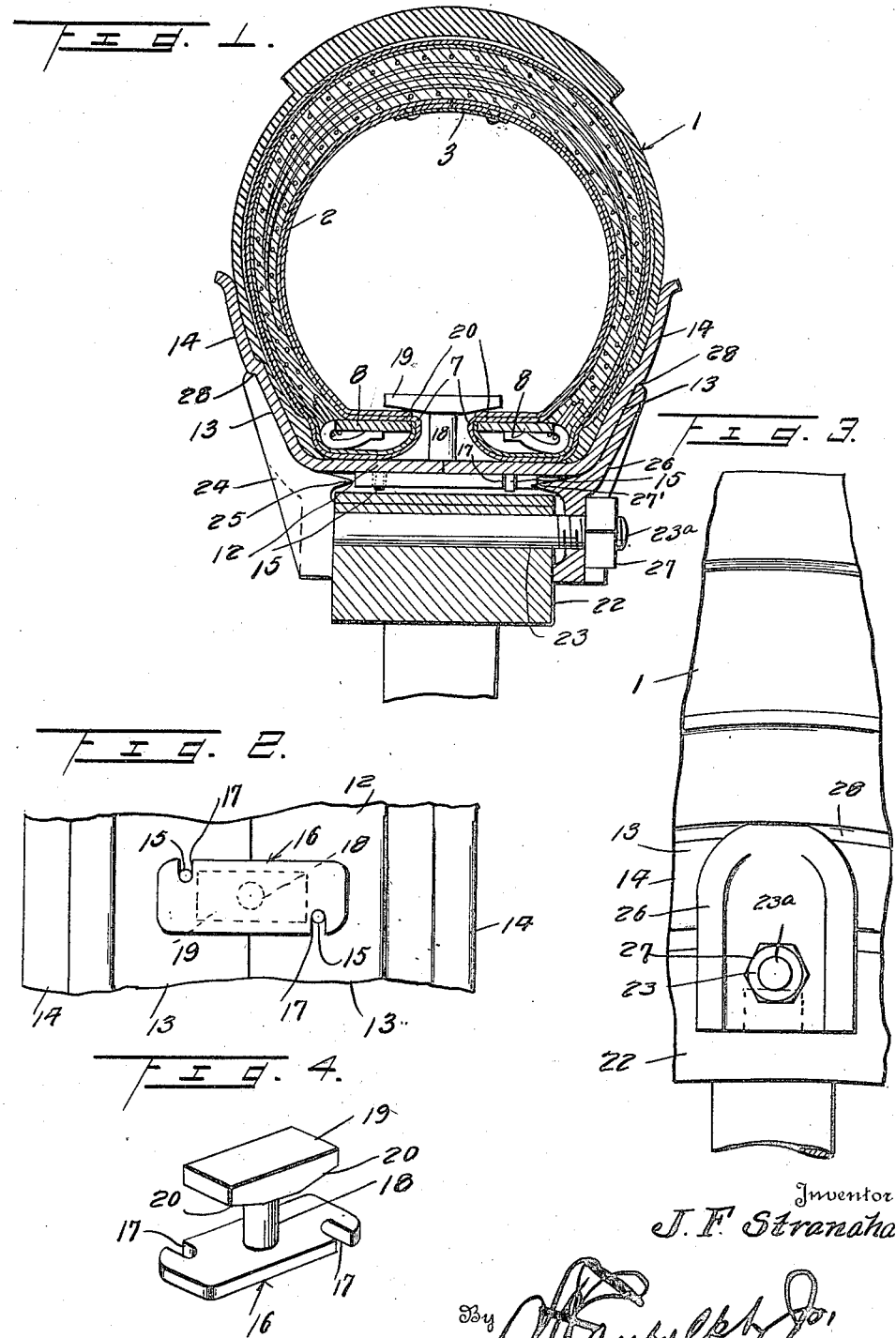

1,465,376

UNITED STATES PATENT OFFICE.

JAMES F. STRANAHAN, OF PITTSBURG, CALIFORNIA, ASSIGNOR OF ONE-HALF TO JOHN F. MORA, OF PITTSBURG, CALIFORNIA.

RESILIENT-TIRE RIM.

Original application filed August 8, 1921, Serial No. 490,604. Divided and this application filed December 15, 1921. Serial No. 522,634.

*To all whom it may concern:*

Be it known that I, JAMES F. STRANAHAN, a citizen of the United States, residing at Pittsburg, in the county of Contra Costa and State of California, have invented certain new and useful Improvements in Resilient-Tire Rims; and I do hereby declare the following to be a full, clear, and exact description of the invention, such as will enable others skilled in the art to which it appertains to make and use the same.

The present invention is a divisional part of the invention for which, on the 8th day of August, 1921, Serial No. 490,604, I filed an application for patent in the United States and relates to a sectional rim for a resilient tire and expanding and securing means both for the rim and tire whereby the latter is supported and made secure.

One object of the invention is the provision of means for securing together the sections of the rim and also forcing the beads of the tire against the flanges of the rim.

A further object of this invention is the extending of the flanges of the rim so that a large proportion of the walls of the tire will be supported and be prevented from breaking when under excessive strain.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:

Figure 1 is a transverse sectional view, illustrating a tire and its rim and constructed in accordance with my invention, Figure 2 is a fragmentary plan view illustrating the means of connecting the sections of the rim, Figure 3 is a fragmentary side elevation, illustrating the securing of the rim with the tire thereon to the felly of a wheel, and Figure 4 is a perspective view, illustrating the sectional rim fastener and tire expander.

Referring in detail to the drawings the numeral 1 indicates the body of a tire which is constructed of rubber and mounted upon a metallic sectional frame 2 which is preferably constructed from a high grade of steel and includes side portions having abutting engagement at the crest of the tire and connected together by a plate 3. The plate 3 extends circumferentially of the tire and is riveted or otherwise secured to the side portions of the frame 2. The body 1 has beads 7 formed on its edges. Anchoring plates 8 are embedded within the beads 7.

These parts are substantially the same as disclosed in the parent application and for the purposes of the present invention may be of any preferred construction.

A rim 12 is provided for the tire and consists of a pair of sections 13 which have formed upon their outer edges tire engaging flanges 14 of considerable height for the purpose of engaging and supporting a large proportion of the side walls of the tire. The sections 13 have pairs of diagonally arranged lugs 15 to be engaged by locking plates 16 which are provided with notches 17 to receive said lugs, consequently preventing separation of the sections of the rim 12. The locking plates 16 are formed integrally with stems or shanks 18 which are adapted to extend through openings in the rim 12 and which openings are formed by oppositely arranged recesses in the opposing or adjacent edges of the sections 13 of said rim. The stems or shanks 18 extend between the beads 7 of the tire and have formed thereon heads 19 provided with beveled or inclined faces 20. When the plates 16 are in rim locking position, the heads 19 are so disposed as to force the beads 7 and the wall of the tire 1 against the flanges 14 of the rim 12 by the beveled faces 20 engaging the beads 7. To remove the tire from the rim, the plates 16 are disengaged from the lugs 15 which turns the heads 19 to extend parallel with the beads 7 whereby the sections of the rim may be separated and the beads of the tire removed from said rim and consequently the removal of the tire in entirety from the rim is thus obtained.

The rim 12 is mounted or positioned upon a felly 22 of a wheel and is retained thereon by fastening means which include bolts 23 extending through the felly and having screw threaded ends 23ª and integral heads 24 which are adapted to engage one of the tire flanges 14 of the rim 12. The heads 24 have tapered projections 25 formed thereon which extend between the periphery of the felly 22 and the rim 12. Removable cleats 26 mounted on the screw threaded ends 23ª of the bolts 23 are retained thereon by nuts 27. The cleats 26 engage the other tire flange 14 of the rim 12 and are of similar shape to the heads 24. Extensions 27' are formed on the cleats 26 and extend between the periphery of the felly and the rim. The tire engaging flanges 14 are provided with annular offsets 28 adapted to form seats for the ends of the heads 24 and the cleats 26 to engage.

While I have shown and described the preferred embodiment of my invention, it will be understood that minor changes in construction, combination, and arrangement of parts may be made without departing from the spirit and scope of the invention as claimed.

Having thus described my invention what I claim is:

A device of the character set forth comprising a sectional rim, flanges formed on said rim, a tire mounted on said rim and engaged by said flanges and having beads, lugs formed on said sections of the rim, plates having notches to receive said lugs, stems formed on said plates and extending through the rim and between the beads of the tire, and heads formed on said stems and having beveled faces to force the beads against the flanges when the plates are moved into engagement with the lugs.

In testimony whereof I affix my signature in presence of two witnesses.

JAMES F. STRANAHAN.

Witnesses:
E. C. RENNICK,
C. G. CROOK.